United States Patent
Andre et al.

(10) Patent No.: US 6,481,758 B1
(45) Date of Patent: Nov. 19, 2002

(54) CONNECTION DEVICE BETWEEN A TUBE AND A FLEXIBLE PIPE AND METHOD FOR MAKING SAME

(75) Inventors: Michel Andre, Lanthenay (FR); Nicolas Rigollet, Lanthenay (FR); Pascal Detable, Gievres (FR)

(73) Assignee: Etablissements Caillau, Issy-Les Moulineaux (FR)

( * ) Notice: Subject to any disclaimer, the term of this patent is extended or adjusted under 35 U.S.C. 154(b) by 0 days.

(21) Appl. No.: 09/462,915

(22) PCT Filed: Jul. 20, 1998

(86) PCT No.: PCT/FR98/01580

§ 371 (c)(1), (2), (4) Date: Jan. 18, 2000

(87) PCT Pub. No.: WO99/05443

PCT Pub. Date: Feb. 4, 1999

(30) Foreign Application Priority Data

Jul. 21, 1997 (FR) .............................. 97 09211

(51) Int. Cl.[7] .............................................. F16L 33/00
(52) U.S. Cl. ..................... 285/256; 285/258; 285/308
(58) Field of Search ................... 285/242, 256, 285/258, 257, 259, 308

(56) References Cited

U.S. PATENT DOCUMENTS

| | | | | | |
|---|---|---|---|---|---|
| 1,468,601 | A | * | 9/1923 | Loughead | 285/256 |
| 1,778,244 | A | * | 10/1930 | Cadden | 285/256 X |
| 1,785,638 | A | * | 12/1930 | Ludwig | 285/242 X |
| 1,786,489 | A | * | 12/1930 | Hopkins | 285/256 |
| 2,562,116 | A | * | 7/1951 | Nelson | 285/258 |
| 3,245,699 | A | * | 4/1966 | Peterman | 285/256 X |
| 3,347,571 | A | * | 10/1967 | New | 285/256 X |
| 3,530,900 | A | * | 9/1970 | Kish | 285/256 X |
| 3,574,355 | A | * | 4/1971 | Oetiker | 285/256 |
| 4,671,542 | A | * | 6/1987 | Juchnowski | 285/256 X |
| 4,850,620 | A | * | 7/1989 | Puls | 285/258 X |
| 4,969,667 | A | * | 11/1990 | Sauer | 285/256 |
| 5,044,671 | A | * | 9/1991 | Chisnell et al. | 285/256 X |
| 5,207,460 | A | * | 5/1993 | Oetkier | 285/258 |
| 5,775,740 | A | * | 7/1998 | Fukaya et al. | 285/256 |
| 5,829,795 | A | * | 11/1998 | Riesselmann | 285/256 |
| 5,855,399 | A | * | 1/1999 | Profunser | 285/308 X |

FOREIGN PATENT DOCUMENTS

| | | |
|---|---|---|
| DE | 39 14645 A1 | 11/1989 |
| DE | 0 627 592 A1 | 12/1994 |
| DE | 0 670 449 | 9/1995 |
| EP | 0 440 564 A1 | 8/1991 |

* cited by examiner

Primary Examiner—Lynne H. Browne
Assistant Examiner—David E. Bochna
(74) Attorney, Agent, or Firm—Nath & Associates PLLC; Gary M. Nath; Marvin C. Berkowitz

(57) ABSTRACT

A system for connecting a tube (10) to a flexible hose (14) having an endpiece (12). One of the two parts constituted by the tube and the endpiece is suitable for fitting in the other of said two parts in a coupling situation, in which first and second locking means (26, 30) belonging respectively to the endpiece and to the tube co-operate for locking the connection. The endpiece has first and second rings (16, 18) disposed one after the other on a first of the inside and outside faces (15A) of the hose (14), and a tubular body (22) which is placed on the second of said faces (15B). A sealing gap (20) is organized between the rings (16 and 18), and the gasket for sealing the connection is formed by a swelling (24) of hose material occupying said gap.

15 Claims, 2 Drawing Sheets

CONNECTION DEVICE BETWEEN A TUBE AND A FLEXIBLE PIPE AND METHOD FOR MAKING SAME

FIELD OF THE INVENTION

The present invention relates to a system for connecting a tube to a flexible hose, the system comprising an endpiece disposed at the end of the hose and having first locking means suitable, when in a coupling situation in which a first of the two parts constituted by the tube and the endpiece is engaged in the second of said two parts, for co-operating with second locking means fitted to the tube, the system further comprising a gasket suitable for sealing the link between the tube and the endpiece in said coupling situation.

For example, if it is the tube which is engaged in the endpiece, then the gasket is disposed inside the endpiece and co-operates with the outside face of the tube.

DESCRIPTION OF THE RELATED ART

Systems of that type are known in which the gasket is constituted by an add-on annular element, generally an O-ring made of rubber or the like. The gasket must be prevented from moving axially since it must not move when the tube is engaged in the endpiece. Consequently, it is necessary to provide the inside periphery of the endpiece with a housing suitable for receiving the gasket and for holding it in place, which implies that the inside periphery of the endpiece must be provided with a shape that is relatively complex. In addition, the gasket must be put into place in its housing after the other parts of the system that form the endpiece have been assembled together. Such installation is relatively difficult to perform since it must be done with sufficient precision to be certain that the gasket is properly placed in its housing, and in any event it requires an additional step to be performed after the parts of the endpiece have been assembled together.

The French patent application published under the No. 2 717 883 also discloses a connection system in which the gasket is "integrated" in the parts of the endpiece. Thus, that endpiece has an outside ring with an opening through which plastics material is injected after the various component parts of the endpiece have been assembled together so as to make the gasket by overmolding. Nevertheless, overmolding is a difficult operation which requires appropriate injection equipment. In any event, the step of injecting the gasket constitutes an additional step after the various component parts of the endpiece have been assembled together.

The present invention seeks to remedy those drawbacks.

SUMMARY OF THE INVENTION

This object is achieved by the fact that the endpiece has first and second rings disposed one after the other on a first of the inside and outside faces of the hose, a "sealing" gap being organized between said rings, the second ring being closer to the end of the hose than the first, by the fact that the endpiece further includes a tubular body which is disposed on the second of said inside and outside faces of the hose and which extends at least over the region of said second face corresponding to the zone occupied by the sealing gap on the first face, and by the fact that the gasket is formed by a swelling of the hose which is to be found in the sealing gap.

In a system for which the tube is engaged in the endpiece, the first and second rings constitute inside rings disposed inside the hose, while the tubular body is placed on the outside face of the hose. Under such circumstances, the swelling is formed projecting radially inwards and is suitable for co-operating with the outside face of the tube to perform its gasket function.

By means of these dispositions, the gasket forms an integral portion of the system and is not constituted by an add-on part. Because of the nature of the material constituting the hose, which is generally rubber or a thermoplastic material that will creep, the swelling is sufficiently flexible to provide sealing by co-operating with the outside periphery of the tube.

Advantageously, the ends of the rings situated on either side of the sealing gap have means for avoiding injuring the hose on either side of the swelling.

This precaution makes it possible to avoid the hose being damaged or abnormally degraded in the region of the swelling during the lifetime of the connection system, thereby ensuring that the swelling continues to perform its sealing function normally.

In an advantageous disposition, the system further includes an intermediate ring disposed between the first and second rings, and first and second sealing gaps in which respective first and second swellings of the hose are formed are respectively organized between the first ring and the intermediate ring, and between the intermediate ring and the second ring.

Advantageously, the elements constituted by the second ring and by the tubular body extend beyond the end of the hose and carry the first locking means.

By way of example, these first locking means may comprise a resilient locking member such as an elastically deformable ring located in the extension formed in this way.

The invention also provides a method of manufacturing a system for connecting a tube to a flexible hose, in which an endpiece is placed at one end of the flexible hose and said endpiece is fitted with locking means suitable, in a coupling situation in which a first of the two parts constituted by the tube and the endpiece is engaged in a second of said two parts, for co-operating with second locking means fitted to the tube, in which method a gasket is provided suitable for sealing the link between the tube and the endpiece in said coupling situation.

A first known method of that type for making systems in which the tube is engaged in the endpiece consists in assembling the various component parts of the endpiece at the end of the hose, while taking the precaution to provide a housing in the inside periphery of the endpiece for the purpose of containing the gasket, then in placing said gasket (generally constituted by an O-ring of rubber or the like) inside the housing. The need to shape the housing for the gasket naturally complicates manufacture of the parts of the endpiece, and the step during which the gasket is placed in said endpiece constitutes an additional step.

The invention seeks to remedy those drawbacks.

This object is achieved by the fact that to place the endpiece at the end of the hose, first and second rings are placed on a first of the inside and outside faces of the hose, by the fact that a "sealing" gap is organized between said rings, by the fact that a tubular body is disposed on the second of the inside and outside faces of the hose with the body being placed in such a manner as to extend at least over the region of said second face which corresponds to the zone occupied by the sealing gap on the first face, and by the fact that the endpiece of the gasket is provided by forming a swelling in the hose which extends in the sealing gap.

In this way, the gasket is made and properly installed during assembly of the rings and the tubular body on the hose. Manufacture is thus simplified since any need to add on a gasket or to manufacture it subsequently is avoided and there is no need to provide a workshop with a location for storing parts such as add-on gaskets or injector apparatus for making the gasket(s).

In an advantageous implementation, in order to form the swelling, those of the elements constituted by the first and second rings and by the tubular body that are located on the outside face of the hose are reduced in diameter. This reduction in diameter is advantageously performed by using a swaging step.

Thus, if the system is of the type in which the tube is engaged in the endpiece, the tubular body is on the outside surface of the hose and the diameter of the tubular body is reduced both for fixing it to the hose and simultaneously for making the swelling which forms the gasket. Swaging constitutes a particularly simple manner of achieving this reduction in diameter. It should be observed that swaging can then be performed by simultaneously holding in place the tubular body and the second ring located towards the end of the hose, and by displacing the swaging tool axially going away from said end. In which case, it can suffice to engage the two rings one after the other inside the hose without taking care to provide a sealing gap between the two rings, and it is the swaging movement which tends to move the second ring away from the first and to enable the sealing gap to be obtained while forming in said gap the swelling which forms the sealing ring.

To make a connection in which it is the endpiece which is engaged inside the tube, the tubular body is placed inside the hose and the two rings are placed on the outside of the hose. The reduction in diameter, e.g. by swaging, is then applied to the two rings which are on the outside of the hose.

To form the swelling, it is also possible to increase the diameter of those elements constituted by the first and second rings and the tubular body which are to be found on the inside face of the hose.

To increase the diameter, an expansion tool is inserted inside the hose so as to co-operate either with the tubular body if it is the tubular body which is placed inside the hose, or else with the first and second rings if it is the rings that are placed inside the hose.

It should be observed that this increase in diameter of the inside elements can be combined with decreasing the diameter of the outside elements as mentioned above or can be performed instead of said decrease.

In an advantageous implementation, an intermediate ring is placed between the first and second rings, first and second sealing gaps are formed respectively between the first ring and the intermediate ring, and between said intermediate ring and the second ring, and first and second swellings are formed in the hose, the swellings extending respectively in the first and second sealing gaps.

In this way, two swellings are made which form two gaskets that are axially spaced apart from each other.

Advantageously, at least one of the elements constituted by the second ring and by the tubular body is allowed to project beyond the end of the hose to form an extension, and the first locking means are placed in said extension.

It should be observed that the invention makes it possible to make the gasket either inside the hose if both rings are disposed inside the hose, or outside the hose if both rings are disposed on the hose.

DESCRIPTION OF THE SEVERAL VIEWS OF THE DRAWINGS

The invention will be well understood and its advantages will appear more clearly on reading the following detailed description of embodiments given as non-limiting examples. The description refers to the accompanying drawings, in which.

DETAILED DESCRIPTION

Figure 1:
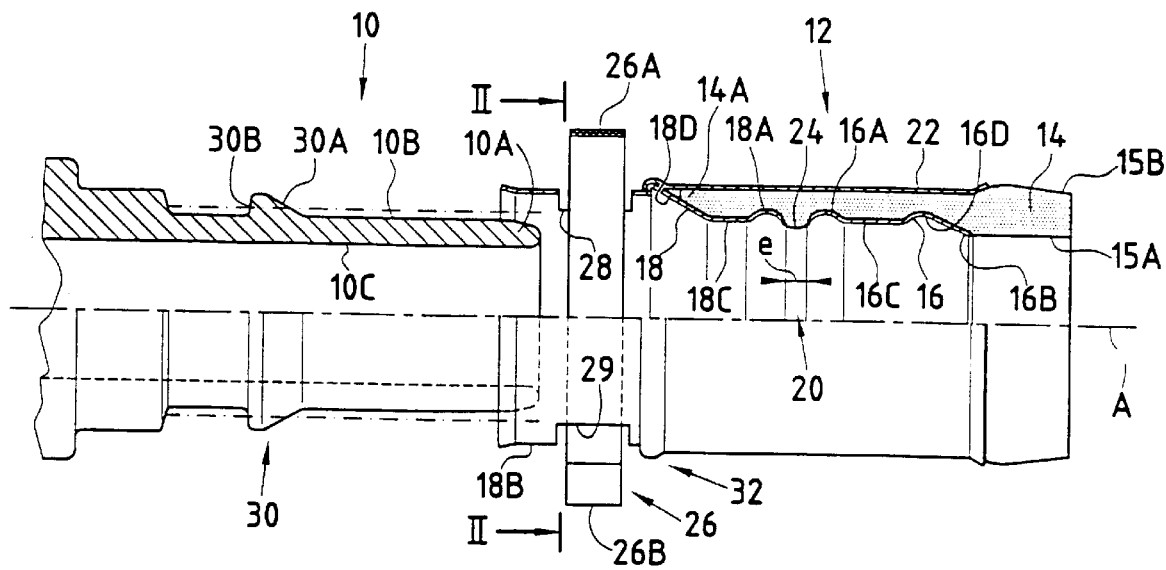
FIG. 1 shows a tube and a connection system of the invention prior to being assembled together in a coupled situation, the top of the figure being in axial section and the bottom being an outside view.

The system shown in FIG. 1 is of the type in which the tube 10 is engaged inside the endpiece 12. More precisely, the endpiece 12 is coupled to the end of the flexible hose 14, e.g. made of rubber or of thermoplastic material capable of creep. The endpiece has first and second rings respectively 16 and 18 disposed inside the hose co-operating with the inside face thereof. These rings are disposed one after the other inside the hose, the ring 18 being the ring closer to the free end 14A of the hose. As shown by reference e in FIG. 1, the facing ends 16A of the ring 16 and 18A of the ring 18 are spaced apart to form a sealing gap 20. A tubular body 22 is placed on the outside face of the hose 14. In the example shown, the tubular body extends substantially from the end 16B of the ring 16 opposite from its end 16A all the way to the free end 14A of the hose. It should be observed that it could extend over a greater or lesser distance, but that it is present at least in the outside face region 15B of the hose which overlaps the sealing gap 20, even though not necessarily exactly in register with said gap. In the gap 20, the hose 14 forms a swelling 24 which constitutes a gasket suitable for cooperating with the outside periphery 10B of the tube 10 when it is engaged in the endpiece.

Figure 2:
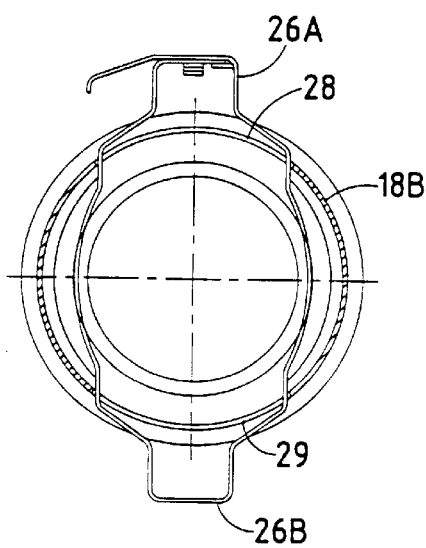
FIG. 2 is a section on line II—II of FIG. 1.

In the example shown, the second internal ring 18 has an extension 18B which carries first locking means constituted by an elastically deformable locking clip 26. To this end, and as can be seen more clearly in FIG. 2, the extension 18B has two slots extending transversely to the axis A of the connection, given respective references 28 and 29, and through which there pass two respective ends 26A and 26B of the oblong locking clip 26. This clip which forms a closed loop has an inside diameter of dimensions slightly greater than the length of the slots 28 and 29 as measured transversely, so that the clip is thus held in place in the endpiece.

On its outside periphery, the tube 10 has a collar 30 which forms second locking means. This collar has a ramp 30A which, when the tube 10 is inserted in the endpiece, co-operates with the clip 26 to deform it elastically, thereby enabling the tube to be inserted. On its side opposite from said ramp 30A, i.e. on its side facing away from the free end 10A of the tube, the collar forms a shoulder 30B which co-operates with the clip 26 to hold the tube locked in the endpiece.

The clip 26 is made, for example, out of spring steel and if the connection is to be unlocked, then it suffices to press on the ends 26A and 26B of the clip so as to increase its inside diameter, thereby enabling the shoulder 30B to be released and then the tube to be withdrawn. The tube is a rigid piece, e.g. made of metal or of a plastics material. At its end (not shown in FIG. 1) remote from its ends 10A that penetrates into the endpiece, the tube may be connected to a flexible hose, e.g. by means of a Christmas-tree shaped endpiece, or by any other appropriate means.

In the example shown, it will be observed that the clip 26 is disposed only in the extension 18A of the ring 18. As an alternative, it could be the tubular body 22 which extends beyond the end 14A of the hose to carry the first locking means, e.g. a clip analogous to the clip 26. It would also be possible for both the ring 18 and the body 22 to extend beyond the end 14A to be coupled to each other and to carry the first locking means. Nevertheless, in the example shown, the tubular body 22 extends over a short distance only beyond the free end 14A of the hose, thereby making it possible to crimp it on a radial projection of the ring 18, as referenced at 32.

As shown below, such crimping is nevertheless not essential.

In FIG. 1 it can be seen that each of the ends 16A and 18A of the rings 16 and 18 is deformed so as to form an annular surface that constitutes a recess relative to the swelling 20. This deformation forms a portion of the surface of a torus. By means of these dispositions, while avoiding the free ends of the rings 16 and 18 situated on either side of the swelling forming radial projections that could harm sealing, it is ensured that the free ends are directed substantially tangentially relative to the sides of the swelling with which they are in contact, thereby making it possible to avoid injuring the hose on either side of the swelling.

In addition to the deformations of the ends 16A and 18A, the rings 16 and 18 have main portions that are cylindrical, given respective references 16C and 18C, where their diameter is slightly greater than the outside diameter of the tube in the region of the tube that extends between its end 10A and its collar 30. The rings 16 and 18 may have other deformations, for example a concave surface 16D is also formed between the cylindrical portion 16C and the end 16B of the ring 16 to contribute to holding the end of the hose in the endpiece and preventing it from moving. Also, a deformation 18D towards the outside forms a transition between the cylindrical portion 18C of the ring 18 and the extension 18B thereof.

Figure 3:
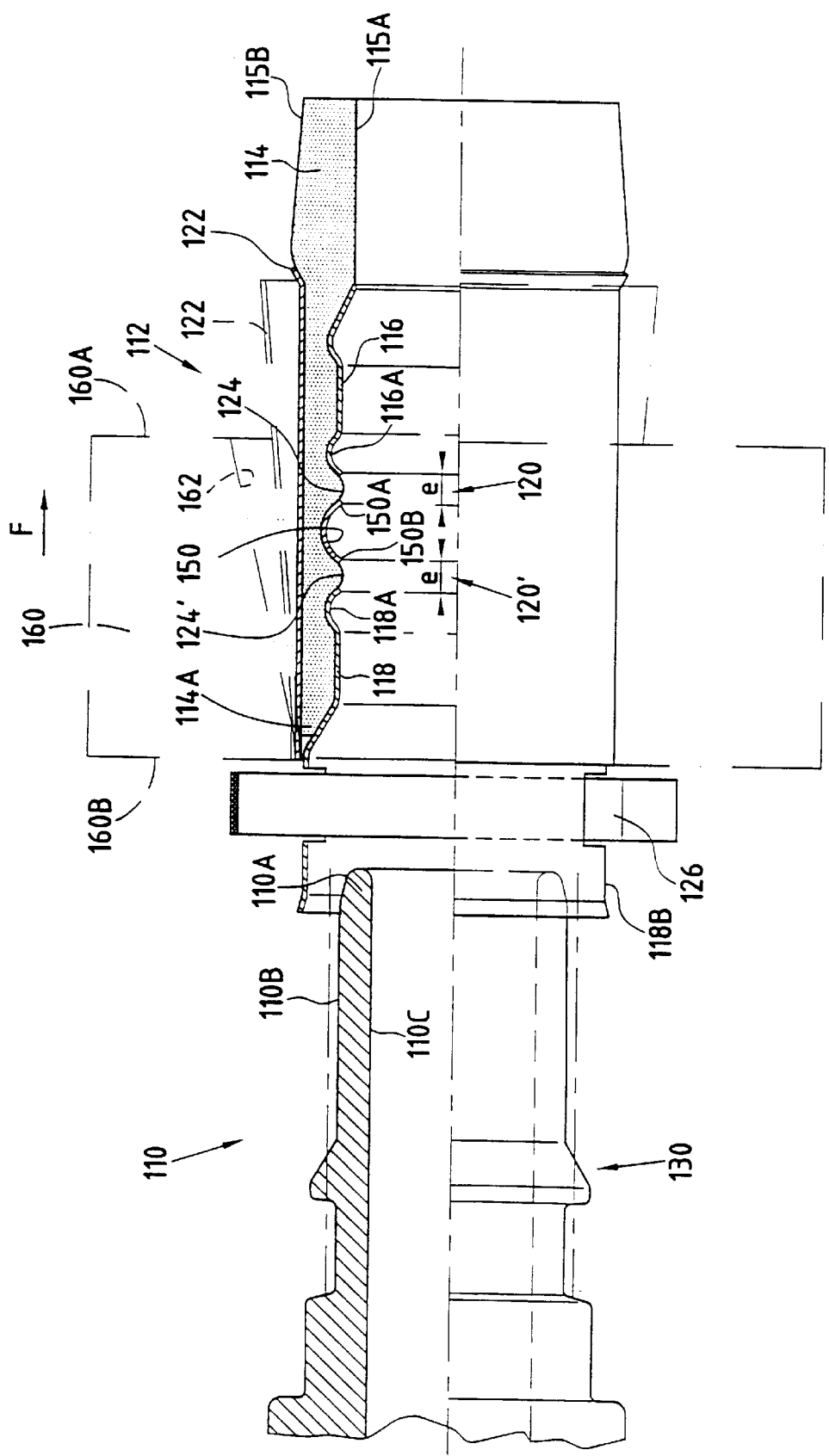
FIG. 3 is a view analogous to FIG. 1, showing another embodiment of the invention.

With reference now to FIG. 3, elements which are common to both FIGS. 1 and 3 are given the same references as in FIG. 1, plus 100. The tube 110 is analogous in shape to the tube 10, and the FIG. 3 connection is likewise of the type in which the tube is engaged inside the endpiece. The inside rings 116 and 118 of the endpiece have generally the same shape as the rings 16 and 18 in FIG. 1. However, an intermediate ring 150 is disposed between the ends 116A and 116B of said rings. The rings 116 and 118 are at a short distance from the ring 150 so that first and second sealing gaps given respective references 120 and 120' are formed between the first ring 116 and the intermediate ring 150, and between the intermediate ring 150 and the second ring 118. In each of these sealing gaps, the hose 114 forms a respective swelling given references 124 and 124', which swellings form two sealing rings that are axially spaced apart from each other. When the tube 110 is engaged in the endpiece 112, these two swellings 124 and 124' co-operate with the outside periphery 110B of the tube to perform sealing.

It will be observed that the ring 150 is shaped so as to avoid injuring the hose. It constitutes a portion of a torus and forms a concave surface that is recessed relative to the swellings 124 and 124' so that the ends 150A and 150B co-operating with the swellings 124 and 124' are substantially tangential to the corresponding sides of the swellings.

As mentioned above, the invention also applies to the case of a connection system in which the tube is placed outside the endpiece, since elements analogous to the tubular body 22 or 122 can be placed inside a hose 14 or 114 and rings analogous to the rings 16, 18 or the rings 116, 150, and 118 can be placed outside the hose, leaving sealing gaps in which swellings of the hose are formed to constitute gaskets which, under such circumstances, are suitable for co-operating with the inside cylindrical face 10C or 110C of the tube 10 or 110.

To manufacture the connection systems shown in FIGS. 1 and 3, the rings 16 and 18 or 116, 150, and 118 as the case may be, are placed inside the hose 14 or 114, and the tubular bodies 22 or 122 are placed outside the hose. Thereafter, the swelling 24 is formed in the sealing gap 20 for the hose 14 or the swellings 124 and 124' are formed in the sealing gaps 120 and 120' for the hose 114. To do this, several solutions are possible. The first consists in reducing the diameter of the tubular body 22 or 122, thereby having the effect firstly of holding the hose in place in the endpiece 12 or 112, and secondly of causing the material from which the hose is made to creep, said material tending to move through the sealing gap(s) so as to form the swelling(s).

It is advantageous to achieve this reduction in diameter by performing a swaging step. Thus, in FIG. 3, a swaging die 160 is shown in dashed lines around the tubular body 122. In conventional manner, the die 160 has an internal cavity 162 of radial dimensions that decrease progressively from a first end 160A to a second end 160B of the die. For example, the cavity 162 may be frustoconical. When, as shown in FIG. 3, the locking clip 126 forms an obstacle to putting the die 160 in place on the tubular body 122 by relative axial displacement between those two items, it is possible to use a die comprising two half-shells which are assembled together around the body 122. Thereafter, starting from the position shown in FIG. 3, it suffices to hold the body 122 in place while moving the die 160 in the direction of arrow F going from end 160B towards end 160A so as to swage the body 122, thereby moving it from the position shown in dashed lines to its position shown in continuous lines.

It should be observed that it is entirely possible to place the rings 116, 150, and 118 inside the hose without taking care to leave sealing gaps 120 and 120', e.g. by placing the ring 150 in contact with the other two rings 116 and 118. The axial swaging movement in the direction F then has the effect, assuming the ring 118 is held, e.g. by extension 118B, of displacing initially the assembly constituted by two rings 116 and 150 so as to form the sealing gap 120', and then of moving only the ring 116 so as to form the second sealing gap 120. The essential point is that the swellings 124 and 124' form in the gaps 120 and 120', but there is no need for the axial length e of the gaps to be accurately defined. Once swaging has been performed, the tubular body 122 is held against the outside surface 115B of the hose 114, with the hose being pinched between the body 122 and the rings 116, 150, and 118, thereby avoiding any risk of the rings or the sleeve being torn off axially. Under such conditions, it is not always necessary for the body 122 to be fixed to the ring 118 by crimping or the like.

Instead of swaging by axially displacing the swaging die 160, it would be possible to use a die having various radial segments defining an internal cavity whose diameter can be varied by displacing the various segments radially, so as to perform radial swaging.

By placing an expansion tool inside the endpiece, it would also be possible to perform an expansion step in which the diameter of the rings 16 and 18 for the connection of FIG. 1, or the diameter of the rings 116, 150, and 118 for the connection of FIG. 3 is increased.

By way of example, it is possible to make the rings and the tubular bodies out of steel of thickness lying in the range 0.6 mm to 0.8 mm, and to use a rubber hose of wall thickness lying in the range 4 mm to 5 mm, with hardness of the order of 65 to 75 on the Shore A scale, e.g. in the vicinity of 70. To assemble together the parts constituting the endpiece and simultaneously make the swelling(s), it is possible to perform a swaging step with a compression ratio (i.e. change in the thickness of the rubber in the swaging zone) of 10% to 30%.

The connection can be used for conveying a fluid fuel, in which case the temperature of the fluid will vary relatively little.

It can also be used for conveying a fluid whose temperature varies considerably, for example a cooling fluid. Under such circumstances, over its lifetime, the connection can be subjected to a large number of thermal cycles. The person skilled in the art must then make sure that the connection is capable of withstanding a given number of cycles corresponding to a design lifetime. Tests can be performed to select a hose material appropriately. For example, it may be necessary to select a material having a small thermal expansion coefficient and a low ratio of remanant deformation in compression.

In numerous applications, it is preferable to use vulcanized rubber. Under such circumstances, it may be desirable to perform the operation of vulcanizing the rubber of the hose only after the connection has been assembled, at least in part (i.e. after the gasket-forming swelling(s) has/have been formed).

What is claimed is:

1. A system for releasably connecting a tube to a flexible hose, the system comprising:

an endpiece disposed at an end of the hose and having first locking means suitable, when in a coupling situation in which a first of two parts constituted by the tube and the endpiece is engaged in a second of said two parts, for co-operating with second locking means fitted to the tube, and in a decoupling situation said first and second locking means being selectively releasable whereby said tube and endpiece can be disengaged;

the system further comprising:

a gasket suitable for sealing a link between the tube and the endpiece in said coupling situation, the endpiece having first and second rings disposed one after the other on a first one of an inside face and an outside face of the hose, a sealing gap being organized between said rings, the second ring being closer to the end of the hose than the first, the endpiece further including a tubular body which is disposed on the second one of said inside face and said outside face of the hose and which extends at least over a region of said second face corresponding to a zone occupied by the sealing gap on the first face, and in that the gasket is formed by a swelling of the hose which is to be found in the sealing gap and which, in said coupling situation, is in sealing contact with the tube.

2. A system according to claim 1, wherein the rings have ends situated on either side of the sealing gap and said ends have means for avoiding injuring the hose on either side of the swelling.

3. A system according to claim 2, wherein the ends of the rings situated on either side of the sealing gap have deformations forming annular surfaces which extend as recesses relative to the swelling.

4. A system according to claim 1, further including an intermediate ring disposed between the first and second rings, first and second sealing gaps in which respective first and second swellings of the hose are formed being respectively organized between the first ring and the intermediate ring, and between the intermediate ring and the second ring.

5. A system according to claim 4, wherein the rings have ends proximate to the swellings and said ends have means for avoiding injuring the hose.

6. A system according to claim 5, wherein the ends to the rings proximate to the swellings have deformations forming annular surfaces which extend as recesses relative to the swellings.

7. A system according to claim 1, wherein the elements constituted by the second ring and by the tubular body extend beyond the end of the hose and carry the first locking means.

8. A method of manufacturing a system for releasably connecting a tube to a flexible hose, in which an endpiece is placed at one end of the flexible hose and said endpiece is fitted with locking means suitable, in a coupling situation in which a first of two parts constituted by the tube and the endpiece is engaged in a second of said two parts, for cooperating with second locking means fitted to the tube, and in a decoupling situation said first and second locking means being selectively releasable whereby said tube and endpiece can be disengaged; and in which method a gasket is provided suitable for sealing a link between the tube and the endpiece in said coupling situation, wherein in order to place the endpiece at the end of the hose, first and second rings are placed on a first one of an inside face and an outside face of the hose, wherein a sealing gap is organized between said rings, a tubular body is disposed on the second one of the inside face and outside face of the hose with the body being placed in such a manner as to extend at least over a region of said second face which corresponds to a zone occupied by the sealing gap on the first face, and wherein the gasket is provided by forming a swelling in the hose which extends in the sealing gap and which, in said coupling situation, is in sealing contact with the tube.

9. A method according to claim 8, wherein in order to form the swelling, those of the elements constituted by the first and second rings and by the tubular body that are located on the outside face of the hose are reduced in diameter.

10. A method according to claim 9, wherein the diameter is reduced by performing a swaging step.

11. A method according to claim 8, wherein in order to form the swelling the diameter of those of the elements constituted by the first and second rings and by the tubular body which are to be found on the inside face of the hose is increased.

12. A method according to claim 8, wherein an intermediate ring is placed between the first and second rings, wherein first and second sealing gaps are formed respectively between the first ring and the intermediate ring, and between said intermediate ring and the second ring, and wherein first and second swellings are formed in the hose, the swellings extending respectively in the first and second sealing gaps.

13. A method according to claim 8, wherein some ends of the rings between which a swelling is formed are provided with means for avoiding injuring the hose.

14. A method according to claim 13, wherein, on the ends of the rings that are to be found on either side of the swelling, annular surfaces are formed which are recessed relative to said swelling.

15. A method according to claim 8, wherein at least one of the elements constituted by the second ring and by the tubular body is allowed to project beyond the end of the hose to form an extension, and wherein the first locking means are placed in said extension.

* * * * *